United States Patent [19]

Miller

[11] 4,360,950
[45] Nov. 30, 1982

[54] CLEANER MOTOR WITH VIBRATION ISOLATION

[75] Inventor: Michael S. Miller, Millersburg, Ohio

[73] Assignee: The Hoover Company, North Canton, Ohio

[21] Appl. No.: 238,558

[22] Filed: Feb. 26, 1981

[30] Foreign Application Priority Data

Nov. 28, 1980 [GB] United Kingdom ............... 8038290

[51] Int. Cl.³ .............................................. A47L 9/22
[52] U.S. Cl. ...................................... 15/412; 15/389; 248/638
[58] Field of Search .................. 15/412, 389, 391; 248/560, 638; 474/94

[56] References Cited

U.S. PATENT DOCUMENTS

| 2,073,158 | 3/1937 | Kindl et al. | 74/242.13 |
| 2,366,479 | 1/1945 | Becker | 15/412 X |
| 2,474,439 | 6/1949 | Segesman | 15/412 X |
| 2,648,396 | 8/1953 | Kirby | 15/412 X |
| 2,898,621 | 8/1959 | Vance | 15/412 X |
| 3,789,686 | 2/1974 | Vogelsgang | 474/94 X |

*Primary Examiner*—Chris K. Moore
*Attorney, Agent, or Firm*—Gerald H. Kreske; Richardson B. Farley

[57] ABSTRACT

A floor care appliance or the like is provided with vibration isolating means for its motor-fan system which includes isolation at the agitator driving motor pulley which acts against belt tension.

8 Claims, 4 Drawing Figures

CLEANER MOTOR WITH VIBRATION ISOLATION

BACKGROUND OF THE INVENTION

1. Field of the Invention

This invention relates to vibration isolation for a motor-fan system in a floor care appliance or the like and, more specifically, relates to a vibration isolation system which acts against belt tension in a driven agitator cleaner.

2. Description of the Prior Art

Although vibration isolation for motor-fan systems in floor care appliances is old and well known, no provision for vibration isolation at the agitator belt drive system is known to have been heretofore utilized, especially when the isolation arrangement is so disposed as to act against belt pull and thereby tends to tension the belt system. Obviously, then, when a belt driven agitator is utilized this additional noise suppression would be advantageous both to overall noise generation and effective belt drive.

Accordingly, it is an object of this invention to provide a vibration isolation arrangement to a floor care appliance adjacent a driving pulley end of the motor-fan system.

It is a further object of this invention to position the vibration isolation adjacent the driving pulley in opposition to belt pull.

It is a still further object of the invention to provide an improved vibration isolation arrangement for a floor care appliance or the like.

SUMMARY OF THE INVENTION

According to the present invention, a suction cleaner motor-fan system is vibrationally isolated by isolation mounts from a main body on which the motor-fan system is carried. A pair of mounts are located on the general center of gravity of the motor-fan system by the use of rubber isolators which are disposed between the motor and integral upwardly extending tabs formed on the cleaner main body. Since the motor must drive an agitator, the driving force imparted to the agitator tends to turn or twist the motor on its aforementioned resilient isolation mounts so that cleaner main body support and a pair of additional resilient isolators are provided at this end of the motor-fan system. These additional mounts are placed under pressure or compressive force upon the general forward swinging of the motor-fan system by being situated between a pair of brackets, one mounted with the motor and the other mounted with the main body in fixed relation. Thus, as the motor swings forwardly, these last two vibration isolation mounts are placed in compression to keep the motor isolated. Their arrangement also tends to put tension on the belt system to aid in tracking and the transmission of driving force to the agitator.

DESCRIPTION OF THE DRAWINGS

Reference may now be had to the accompanying drawings for a better understanding of the invention, both as to its organization and function, with the illustration being only exemplary, and in which.

DETAILED DESCRIPTION OF THE INVENTION

Figure 1:
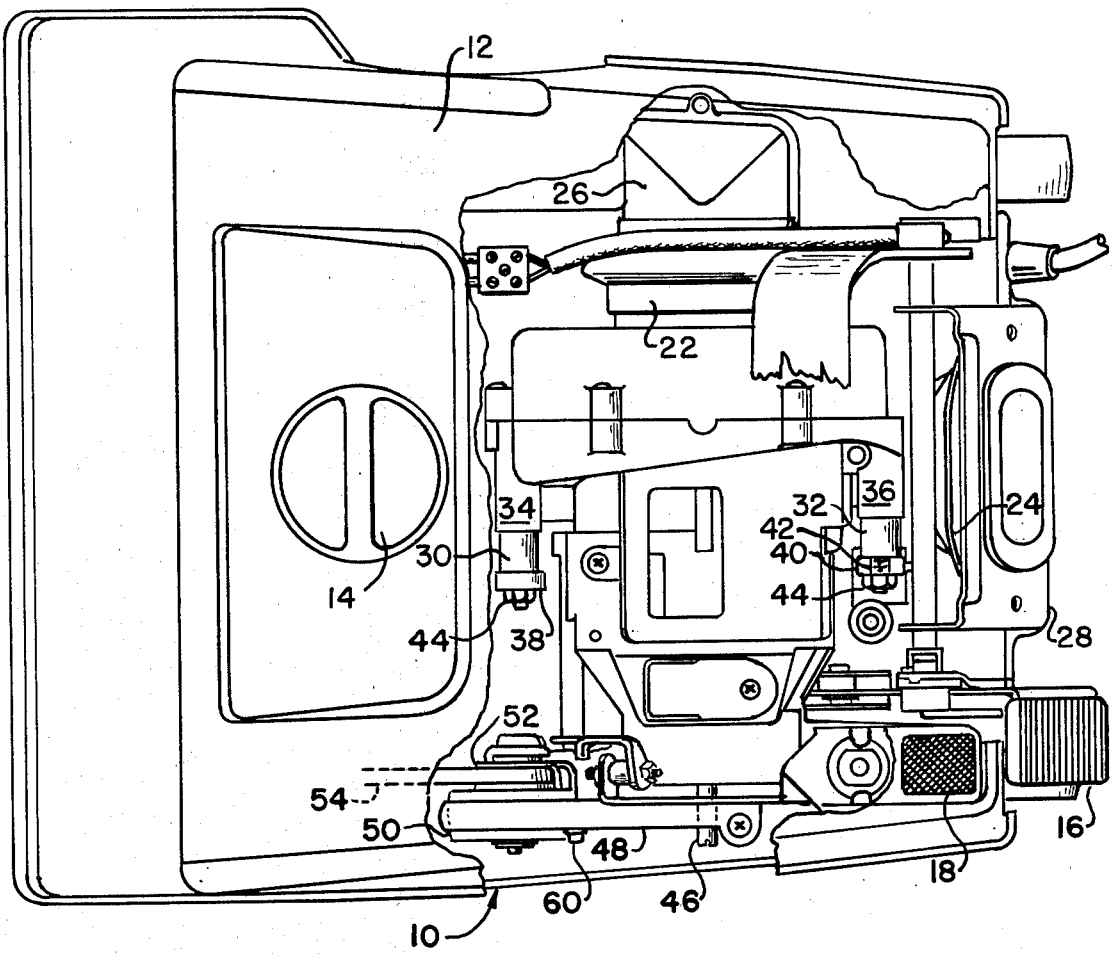
FIG. 1 is a plan view of the main body with the hood broken away to show many of the operating components for the cleaner.
Figure 2:
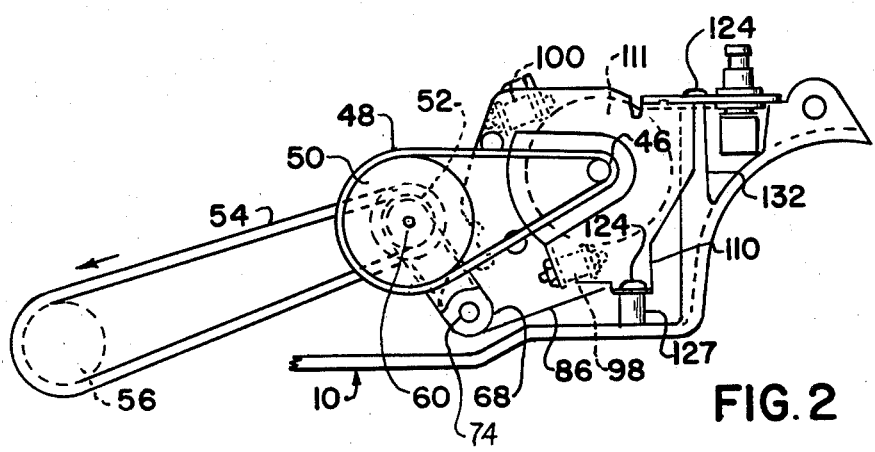
FIG. 2 is an elevational side view of the pulley drive system and the respective vibration isolators.

The cleaner can generally consist of a cleaner main body 10 covered by a hood 12 (shown fragmentarily), height adjustment means 14, a handle release 16 and a switch pedal 18 provided for on and off operation of the cleaner. All of these elements may be substantially conventional so no further description of them is offered.

The motor-fan system 20 includes bellows like isolation means 22 and 24 which communicate, respectively, with a duct 26 which may extend forwardly to the agitator aperture (not shown) in the cleaner main body 10 and to a bag flange 28. Thus, the motor-fan system 20 is resiliently mounted relative to the air delivery and vacuum system on the cleaner.

Figure 3:
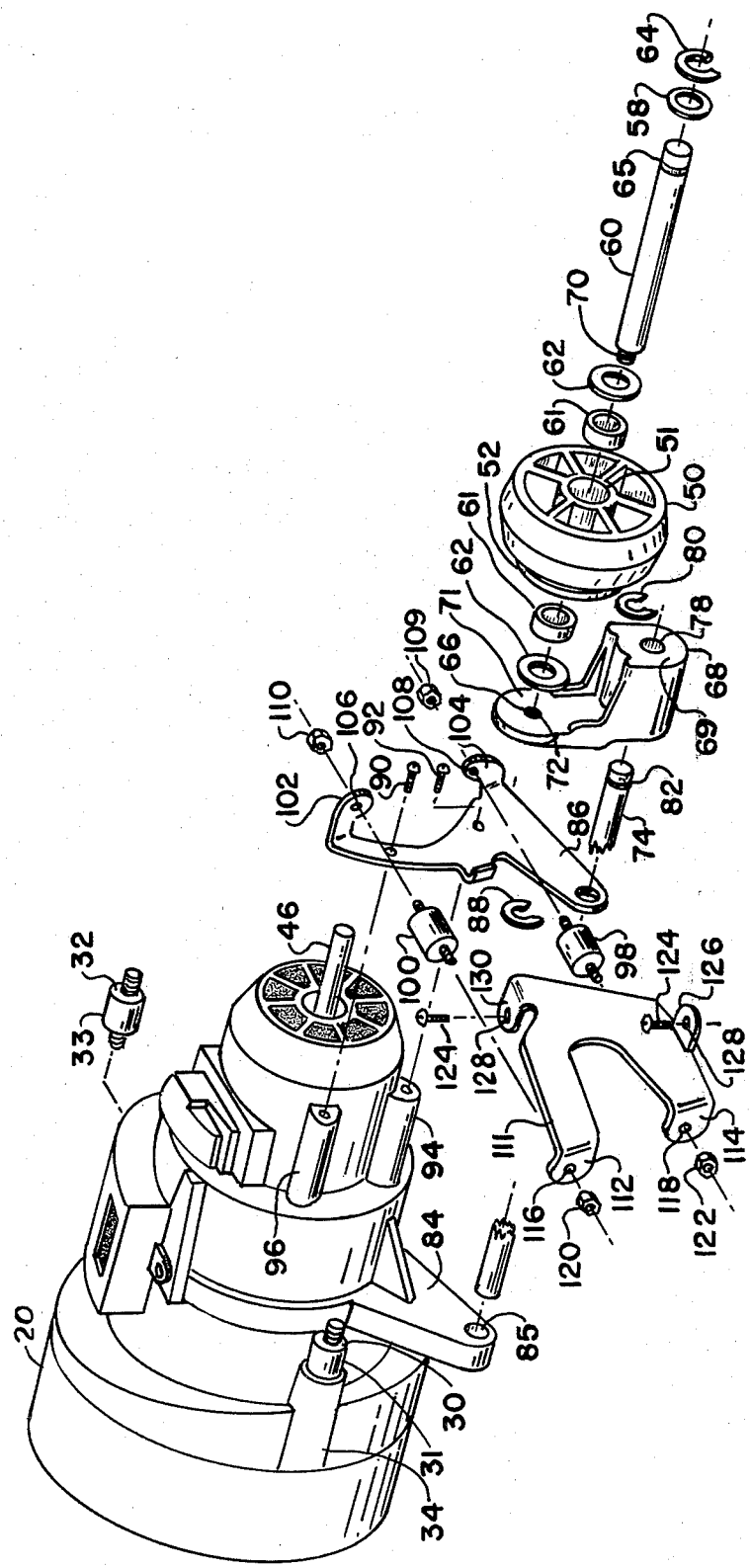
FIG. 3 is an exploded perspective view of the motor, idler pulley system, and associated parts.
Figure 4:
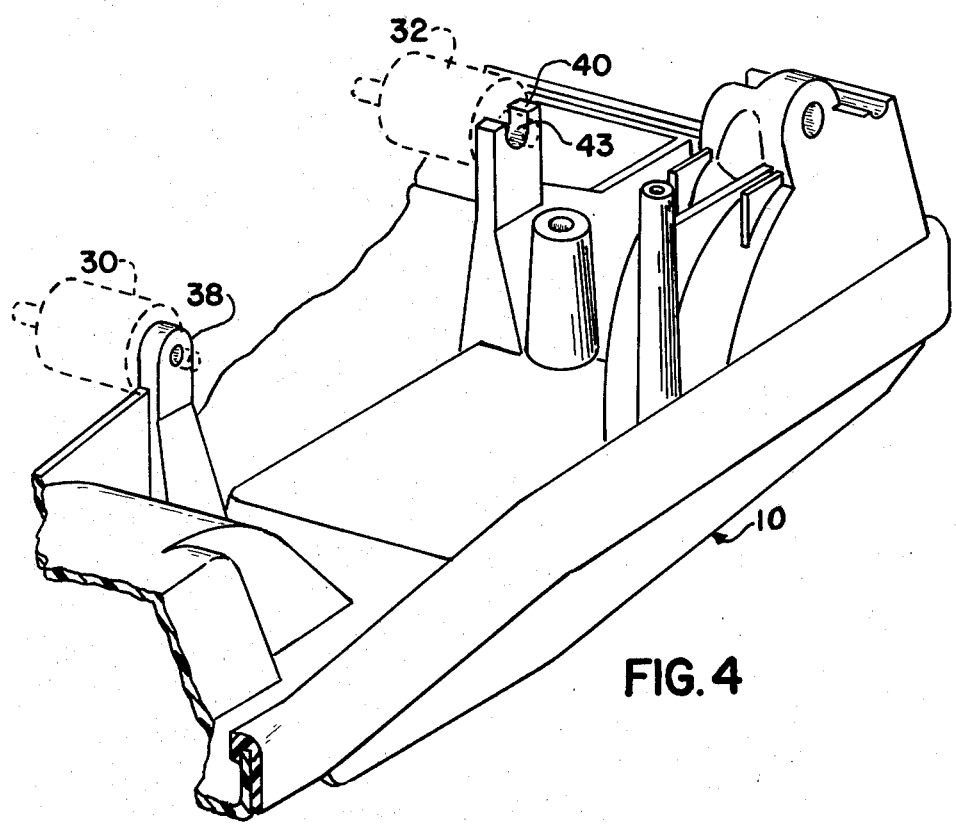
FIG. 4 is a partial perspective view of the main body showing the lug mounting of the main motor isolators, with the isolators in undeflected condition.

Motor-fan system 20 is also isolated vibrationally from the cleaner main body 10 on its center of gravity by a pair of resilient mounts 30 and 32 which are centered deflected relative to the center of gravity of the motor-fan system 20. These mounts are received in a pair of bosses 34 and 36 fixed to the motor-fan system 20 and upwardly extending tabs 38 and 40 having a bore and an open slot 42 therethrough which receive one of the threaded stud ends of each of the suppressors with the suppressors attached thereto by nuts 44, 44. The ends of the mount adjacent bosses 34 and 36 thread into these bosses. The vibration isolation mounts 30 and 32 can be seen in FIG. 3 to comprise central enlarged cylindrical isometric portions 31, 33 into whose ends have been moldably mounted threaded stud means so as to provide for the easy mounting of these vibration isolation mounts for isolation purposes. The mounts are substantially conventional and widely obtainable from a variety of commercial sources.

At the motor end of the motor-fan system 20 is a motor shaft 46 extending sidewardly towards the edge of the cleaner main body 10. An elastomeric belt 48 of flat, generally stretchable nature is mounted on this shaft and extends forwardly to be entrained at its other end around a pulley 50. The pulley 50 is enlarged relative to the diameter of the shaft 46 so the angular speed reduction occurs between the shaft 46 and a hub 51 which integrally mounts the pulley 50. Integral with the pulley 50 is a smaller pulley 52 that trains a fiber reinforced V-belt 54 of relatively unstretchable nature that, in turn, extends forwardly so as to train around an agitator 56 having a larger diameter to drive it at a much reduced speed than the rotational velocity experienced by the motor shaft 46. This reduced speed of rotation of the agitator 56 provides a cleaner having a lower noise output based on the reduced noise generated by the slowed agitator and its beater bars and/or brushes.

Integral pulleys 50, 52 are journalled on an axle 60 to serve as a bearing means for rotation of the integral pulleys 50 and 52. At its one end, the axle 60 has a washer 58 and an E-ring 64 mounted thereover, with the E-ring 64 mounted in a peripheral groove 65 in axle 60 to prevent movement of the integral pulleys 50, 52 off the end of the axle 60. The axle 60 is anchored at its other end by means of a bore 66 in a support bracket 68 of general L-shaped configuration. The bore 66 is disposed in an upper leg 71 of the L with the shaft 60 placed therethrough and a threaded end 70 engages threads 72 in bore 66 to maintain the axle 60 in position for rotatably journalling the pulleys 50 and 52.

The bracket 68 is pivotally mounted relative to the motor-fan system 20 so as to permit alignment of the belts 48 and 54 over their respective pulleys so that the same may generally equalize their tensions, train properly and provide a rotational driving force to the agitator 56. This pivoting is occasioned by a shaft 74 which extends through a bore 78 in the generally L-shaped member 68. Support bracket 68 is prevented from sliding off the end of shaft 74 by means of an E-ring 80 which nests in a peripheral groove 82 adjacent the end of the shaft 74. Thus, the support bracket 68 is pivotal for the smooth running of the belts 48 and 54.

In order to maintain a constant axis of rotation of the shaft 74 relative to the axis of rotation of motor shaft 46 of motor-fan system 20, the shaft 74 is mounted therewith so that movement of the motor-fan system 20 on its resilient mounts 30 and 32 will not tend to misalign the axis of motor shaft 46 and the axis of the pulley 50. Thus, the flat elastomeric belt tends to track properly, completely independent of the movement of the motor-fan system 20 relative to the cleaner main body 10. This relative positioning is fairly critical since the use of a flat belt requires a more positive tracking arrangement than the use of the V-belt such as that that extends forwardly to the agitator 56.

The means for mounting the shaft 74 relatively (fixed centers) with the motor-fan unit 20 comprises an integral lug 84 extending radially outwardly from the housing of the motor-fan unit 20 and having a blind bore 85 therein to receive a portion of the shaft 74 in a nested relationship. The shaft 74 extends outwardly and sidewardly from this retention means to extend through a bracket 86 fixed with the motor-fan system 20 and then through the bore 78 in the bracket 68. An E-ring 88 contacts the shaft 74 in a groove (not shown) on the inward side of the bracket 86 so that it and the E-ring 80 maintains the shaft 74 in its desired position with the bottom portion of leg 71 abutting the inside of the bracket 68 adjacent the bore 78. At the same time, the bracket 86, through a pair of bolts 90 and 92 which attach threadingly to a pair of lugs 94 and 96 fast with the motor housing, insure that the shaft 74 moves as the motor-fan unit 20 moves on its resilient mount. Then the pulley 50 tracks properly with elastomeric flat belt 48 relative to the motor shaft 46 due to the pivotal motion of the support bracket 68 on a fixed center relative to the motor shaft 46.

The vibration isolation at the motor shaft end of motor-fan system 20 will now be detailed. The bracket 86 mounts one end of a pair of resilient mounts 98, 100 which are smaller sized than the resilient mounts 30 and 32 but have a similar construction. This is accomplished by a pair of integral sidewardly and outwardly extending lugs 102 and 104 disposed at the upper and lower reaches of the bracket 86 having, respectively, bores 106 and 108, for reception of one end of each of the resilient mounts 98 and 100. A pair of nuts 110 and 109 are screwingly threaded on the threaded studs of the resilient mounts 98 and 100 to pull the same against the inside surfaces of the tabs 102 and 104. The bracket 86, then, and the attached resilient mounts 98 and 100 form the isolation barrier between the attached motor-fan unit 20 and the cleaner main body 10 (by the utilization of a second bracket 111).

Bracket 111 includes a pair of sidewardly and inwardly extending tabs 112 and 114 with a corresponding pair of bores 116 and 118 through which the other threaded sides of the resilient mounts 100 and 98 extend. Nuts 120 and 122 thread on the threaded studs extending from the resilient mounts 100 and 98 to pull these mounts against the facing sides of the inwardly extending tabs 112, 114. The bracket 111 is secured to the main body 10 by the means of a pair of self tapping screws 124, 124 that extend through bores 128, 128 in sidewardly extending tabs 126 and 130 integral with the bracket 111 into posts 127 and 132, upwardly extending from the major portion of the main body 10. This arrangement secures a portion of bracket 111 relative to the main body 10. A second bore 128 extends through an inwardly horizontally extending tab 130, integral with the bracket 111, so as to be engaged on an upwardly extending post 132, integral, but upwardly disposed relative to the base portion of the main body 10.

The operation of the resilient damping system for the motor-fan unit 20 may now be easily ascertained. Motor-fan system 20 is resiliently vibrationally isolationally mounted by the resilient mounts 30 and 32 at its general center of gravity. At the same time, because of the pull of flat belt 48 on motor shaft 46, the motor-fan unit 20 tends to cant forwardly. However, this moves bracket 86 forward since the same is fixed relative to the motor-fan unit 20 placing a compressive force on resilient mounts 100 and 98 as the same react against the bracket 111 fixed to the main body 10. This arrangement, then, tends to vibrationally isolate the motor-fan unit 20 at its belt end from the main body 10 and at the same time provides a resilient compressive force by means of the resilient mounts 100 and 98 tending to stretch the belts 38 and 54 so that the same may transmit a maximum amount of power to the agitator 56.

It will be appreciated that the invention provides vibration isolation for a cleaner motor-fan system utilizing an agitator drive and that the invention can take many forms and that the embodiment illustrated and described is exemplary only.

I claim:
1. For use in a floor care appliance having a suction nozzle body in part enclosing a rotatable agitator, the structure including;
   (a) a vibration inducing motor-fan unit for creating a flow of air into said nozzle and having a projecting shaft,
   (b) a first belt trained over said shaft and extending to an intermediate pulley arrangement;
   (c) a second belt trained over said intermediate pulley and driving said rotatable agitator,
   (d) a means for vibrationally isolating said motor-fan unit from said body of said cleaner mounted in compression in line with one of said belts to provide vibration isolation of said motor-fan unit from said body at the belt end of said motor-fan unit.
2. The combination as set out in claim 1 wherein;
   (a) said in line relationship of said means for vibrationally isolating said motor-fan unit from said body is generally in alignment with the second of said belts.
3. The combination set out in claim 1 wherein;
   (a) a second vibration isolating means for isolating said motor-fan unit from said body is disposed at the center of gravity of said motor-fan unit.

4. The combination set out in claim 1 wherein;
(a) said first vibration isolating means comprises, generally, a pair of elastomeric blocks disposed in vertical alignment.

5. The combination set out in claim 1 wherein;
(a) said second vibration isolating means comprises, generally, a pair of elastomeric blocks disposed axially aligned with the motor-fan unit and at its center of gravity.

6. The combination set out in claim 1 wherein;
(a) a first bracket extends outwardly and forwardly towards said agitator from a case of said motor-fan unit, at the belt end,
(b) a second bracket, attached to said body, extends forwardly from said first bracket,
(c) elastomeric blocks are captivated between said first and second brackets.

7. The combination set out in claim 6 wherein;
(a) said second belt, upon tensioning, pulls said first bracket forwardly compressing said elastomeric blocks.

8. For use in a floor care appliance having a nozzle, the structure including;
(a) a vibration inducing motor-fan unit for creating a flow of air into said nozzle and having a projecting, overhanging shaft,
(b) primary vibration isolating means at the center of gravity of said motor-fan unit and supporting the latter in a normal operating position upon said appliance while vibrationally isolating said appliance therefrom,
(c) a belt trained about said overhanging shaft and under tension to exert a transverse force on said motor-fan unit tending to shift the latter from its normal operating position,
(d) and secondary vibration isolating means opposing the tension of said belt and the transverse force exerted thereby on said motor-fan unit thereby opposing belt-induced shifting of said motor-fan unit from its normal operating position.

* * * * *

UNITED STATES PATENT OFFICE
CERTIFICATE OF CORRECTION

Patent No. 4360950             Dated 30 November 1982

Inventor(s)     Michael S. Miller

It is certified that error appears in the above-identified patent and that said Letters Patent are hereby corrected as shown below:

Column 2, line 49, delete "angular".

Signed and Sealed this

Twenty-fourth Day of May 1983

[SEAL]

Attest:

DONALD J. QUIGG

Attesting Officer     Acting Commissioner of Patents and Trademarks